United States Patent [19]

Holdampf

[11] Patent Number: 4,979,716
[45] Date of Patent: Dec. 25, 1990

[54] FOUR-WAY MANUAL AUTOMOTIVE SEAT ADJUSTMENT ASSEMBLY

[75] Inventor: Carl J. Holdampf, Farmington Hills, Mich.

[73] Assignee: Douglas & Lomason Company, Farmington Hills, Mich.

[21] Appl. No.: 382,280

[22] Filed: Jul. 19, 1989

[51] Int. Cl.⁵ ............................................. F16M 13/00
[52] U.S. Cl. .................................. 248/393; 248/397; 248/420
[58] Field of Search ............... 248/652, 662, 664, 669, 248/371, 393, 397, 398, 157, 419, 420, 421, 423, 424, 429; 297/326, 327, 328

[56] References Cited

U.S. PATENT DOCUMENTS

| | | |
|---|---|---|
| 3,853,295 | 12/1974 | Christin . |
| 4,247,071 | 1/1981 | Carella et al. . |
| 4,629,151 | 12/1986 | Nishino ................................ 248/421 |
| 4,767,156 | 8/1988 | Yamada ................................ 248/397 |
| 4,771,975 | 9/1988 | Johnson et al. . |
| 4,805,865 | 2/1989 | Goforth .............................. 248/397 |

FOREIGN PATENT DOCUMENTS 2051958  8/1979  Fed. Rep. of Germany ...... 248/397

Primary Examiner—Ramon O. Ramirez
Assistant Examiner—Robert A. Olson
Attorney, Agent, or Firm—Harness, Dickey & Pierce

[57] ABSTRACT

A manually operable four-way automotive seat adjustment assembly is disclosed. The assembly includes a fore and aft adjustment mechanism together with a vertical adjustment mechanism that enables the seat frame member to pivot up and down relative to the carriage/base subassembly. A combination quadrant-/lift link is pivotably mounted to the seat frame member and has a support pin fixedly attached thereto at a point radially spaced from the pivot point of the quadrant. The support pin is journalled to a mounting bracket that is slidably mounted to the carriage member so that the bracket can take up the fore and aft movement of the support pin as the quadrant rotates with the raising and lowering of the seat frame. The mounting bracket is preferably made of a hard plastic material to reduce noise and provide ease of operation.

12 Claims, 4 Drawing Sheets

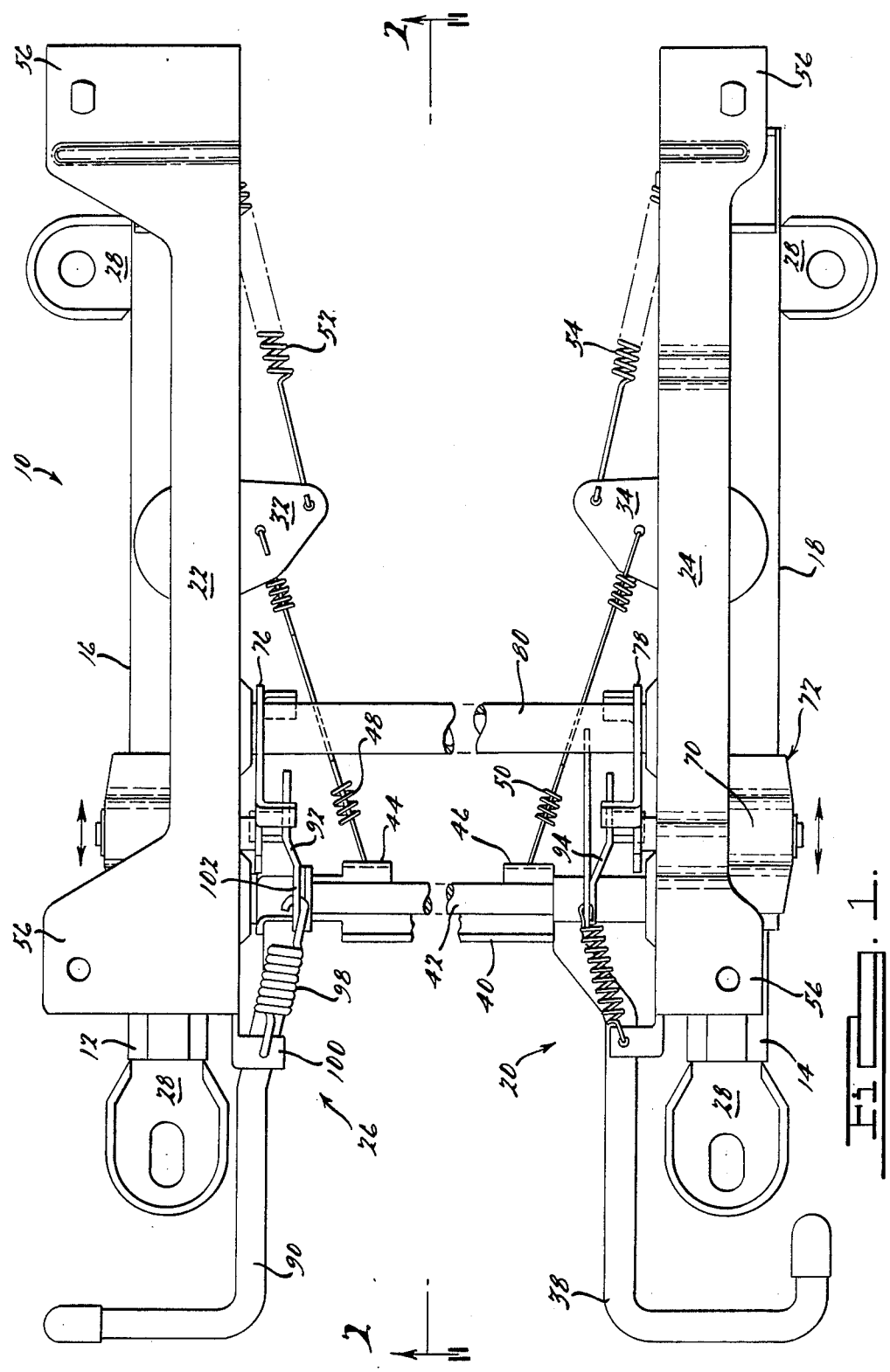

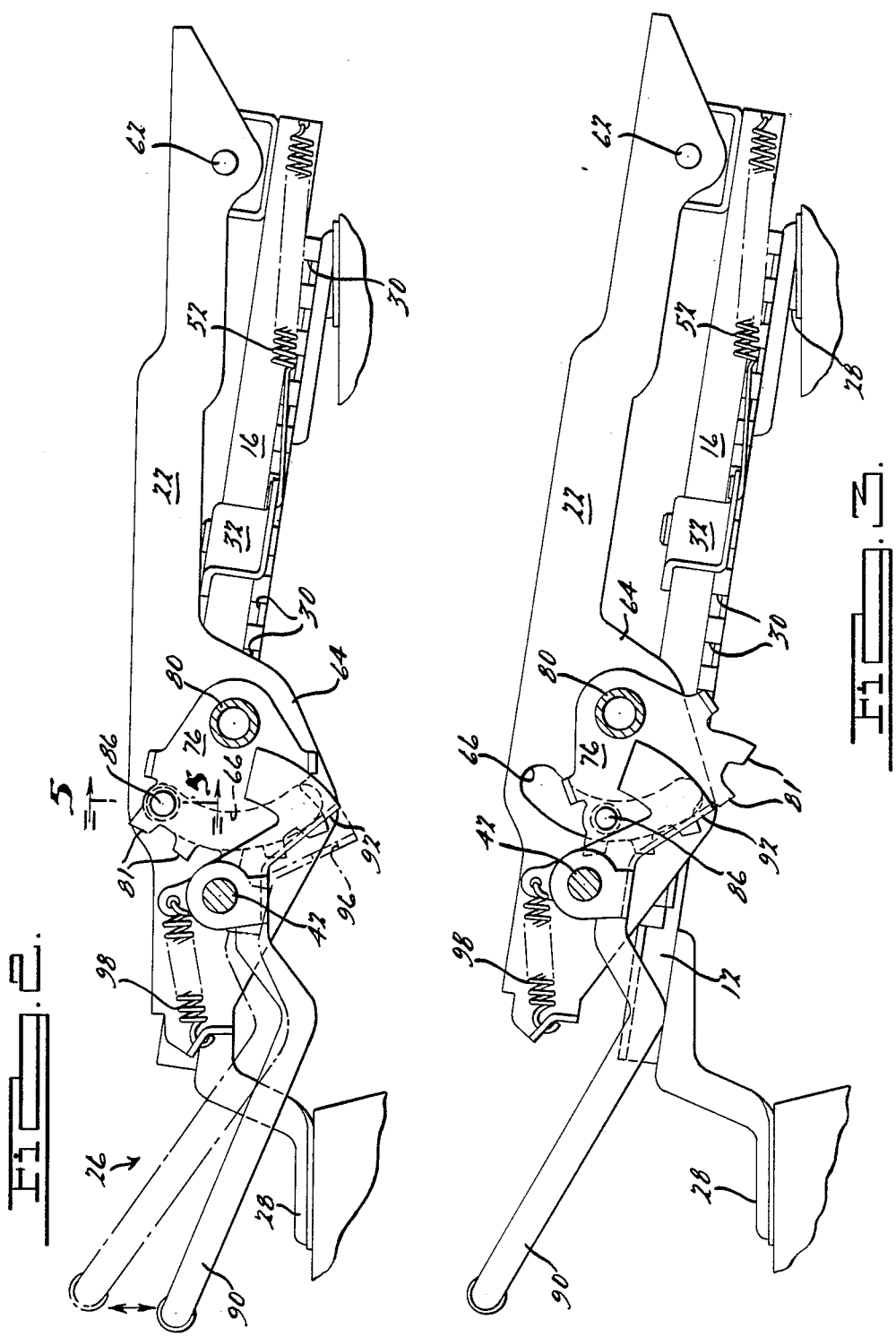

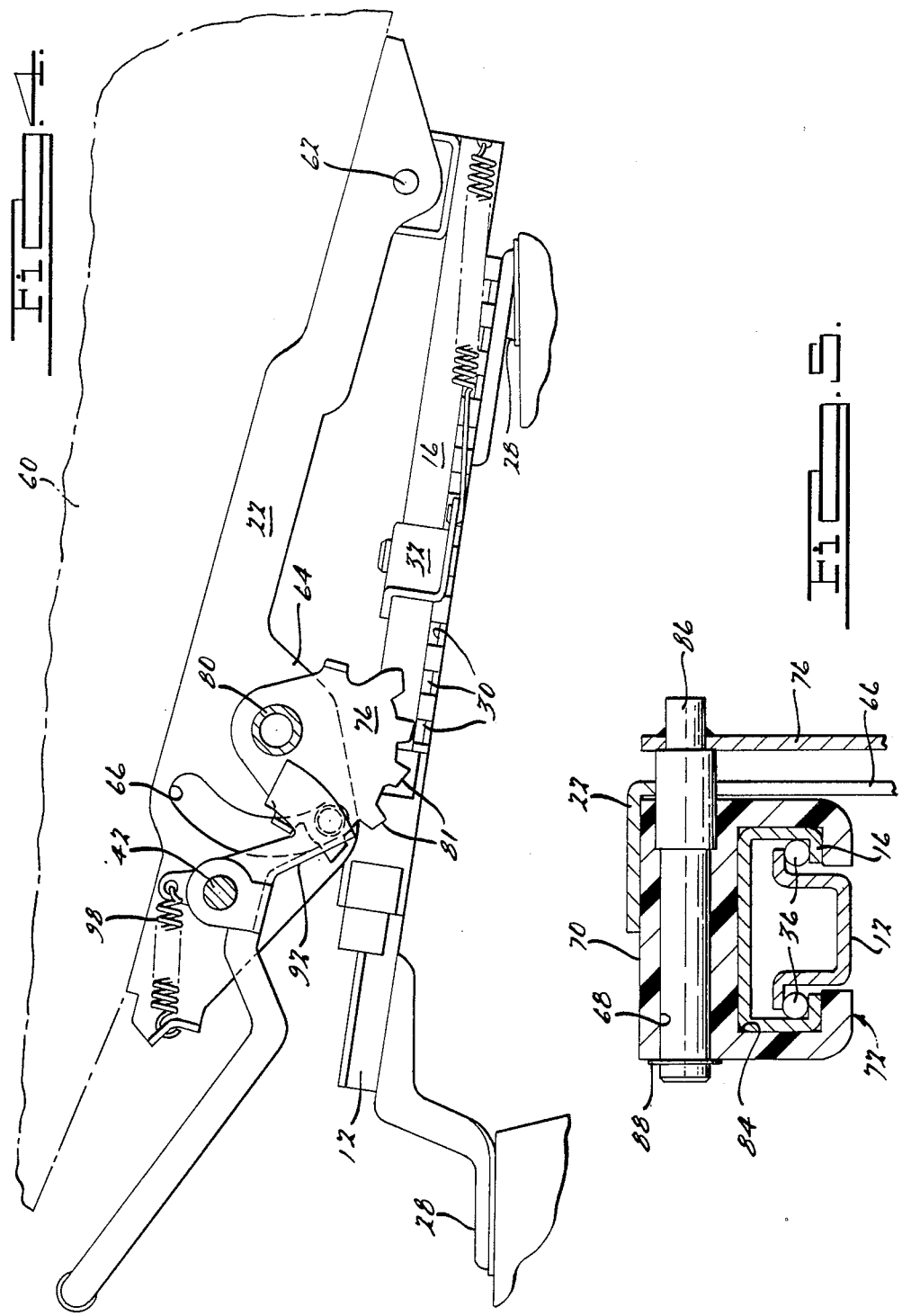

FOUR-WAY MANUAL AUTOMOTIVE SEAT ADJUSTMENT ASSEMBLY

BACKGROUND OF THE INVENTION

The present invention relates to automotive vehicle seating and, more particularly, to automotive vehicle seats equipped with manual four-way adjustment assemblies.

Traditionally, only expensive luxury type vehicles have been equipped with seating that is adjustable in multiple directions in addition to fore and aft. Recent consumer demand, however, has made it increasingly important for automobile manufacturers to offer enhanced seat adjustment capability on less expensive vehicles. The cost and weight penalties associated with conventional power seat adjustment systems makes their application in smaller, less expensive vehicles impractical. Accordingly, the use of manual seat adjustment mechanisms is dictated for such applications.

Many different manual seat adjustment mechanisms have been proposed. However, there remains a need for a manual seat adjustment mechanism that is relatively simple in design and construction and therefore inexpensive to manufacture, is durable, and yet is light in weight, quiet, and easy to operate.

It is the primary object of the present invention to provide a four-way manual seat adjustment assembly that satisfies these criteria. In particular, the present invention discloses an improved mechanism for manually adjusting the position of a vehicle seat in either the up and down directions or the fore and aft directions. The present invention, in general, comprises a pair of stationary tracks defining a substantially horizontal plane. Elongated carriages are slidably coupled with the tracks and move longitudinally thereon. A mechanism is coupled with the tracks and carriages which enables selective movement of the carriages longitudinally along the tracks. Also, a vertical adjustment mechanism is provided that is coupled with the seat assembly to enable vertical adjustment of the seat assembly.

The vertical adjustment mechanism includes a pair of quadrants or lift links that are rotatably journalled to the seat frame members fastened to the underside of the seat bottom. The seat frame members are pivotably mounted at their rearward end to the carriages. A pair of pivot pins is fixedly attached to the quadrants/lift links and journalled to a pair of brackets that is in turn slidably mounted to the forward ends of the carriages. Vertical movement of the seat frame members relative to the carriages raises and lowers the pivot point of the quadrants/lift links, thereby causing the quadrants/lift links to rotate. The slidable mounting brackets take up the horizontal movement of the pivot pins as the quadrants rotate. A locking mechanism including a pawl that is engagable with teeth on the quadrants is provided to secure the seat frame in a selected vertical position. In addition, plastic bushings are provided at each of the various pivot points in the preferred embodiment to provide smoothness of operation and to minimize the amount of noise generated by the mechanism when operated.

From the following specification in connection with the accompanying drawings, other objects and advantages of the present invention will become apparent to those skilled in the art.

BRIEF DESCRIPTION OF THE DRAWINGS

FIG. 1 is a top plan view of a four-way seat assembly in accordance with the present invention;

FIG. 2 is a sectional view taken along line 2—2 of the four-way seat assembly shown in FIG. 1;

FIG. 3 is a sectional view taken along line 2—2 similar to that of FIG. 2 with the seat assembly in a second position;

FIG. 4 is a sectional view taken along line 2—2 similar to that of FIG. 2 with the seat assembly in a third position;

FIG. 5 is a sectional view taken along line 5—5 in FIG. 2;

DETAILED DESCRIPTION OF THE PREFERRED EMBODIMENT

Figure 6:
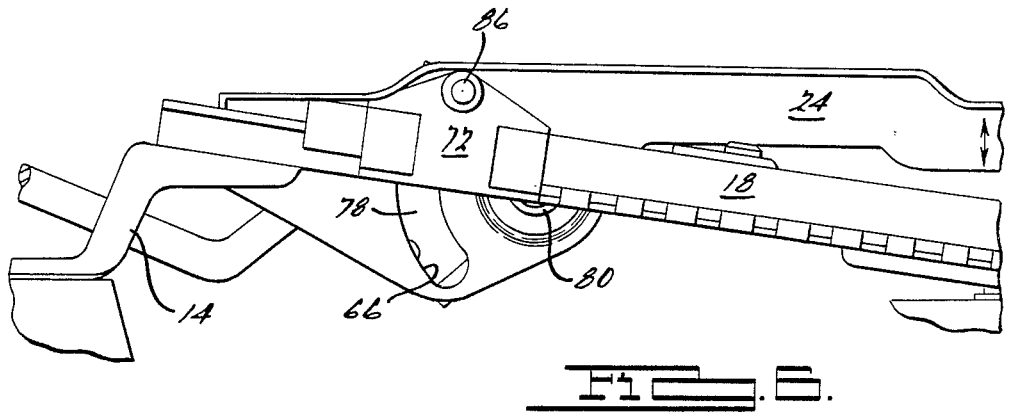
FIG. 6 is a side elevation view of the four-way seat assembly in accordance with the present invention.

Referring to the drawings, particularly FIGS. 1 and 4, a manually operable four-way seat adjustment assembly is illustrated and designated with the reference numeral 10. The four-way seat adjustment assembly 10 includes a pair of track members 12 and 14, carriages 16 and 18, a horizontal adjustment mechanism 20, seat frame members 22 and 24, and a vertical adjustment mechanism 26.

The rails 12 and 14 are elongated, U-shaped in cross-section, and include mounting members 28 for securing the rails 12 and 14 to the floor of a vehicle. A pair of carriages 16 and 18 are slidably mounted to the rails 12 and 14, respectively, for relative movement in the fore and aft directions. In addition, seat frame members 22 and 24, which are bolted via mounting pads 56 to the underside of the seat bottom, are in turn pivotably mounted at their rearward ends by pins 62 to carriages 16 and 18 for providing up and down movement of the seat.

The carriages 16 and 18 are elongated and have an overall rectangular shape in cross-section with a channel along one of the sides thereof to enable the rails 12 and 14 to be slidably positioned within the carriages 16 and 18 as seen in FIG. 5. Rollers 36, of the ball type, are positioned between the carriages 16 and 18 and the rails 12 and 14 to enable movement of the carriages 16 and 18 along the rails 12 and 14 in a substantially horizontal plane.

The horizontal adjustment mechanism 20 which provides selective fore and aft slidable movement of the carriages 16 and 18 on the rails 12 and 14 includes a handle 38 fixably secured to a crossbar 40. The crossbar 40 is rotatably secured to a torsion bar 42 and includes a pair of downturned flanges 44 and 46 which are secured to biasing linkages 48 and 50, respectively. Biasing linkages 48 and 50 are secured to levers 32 and 34, respectively. Also, biasing springs 52 and 54 are secured between the levers 32 and 34, respectively, and the carriages 16 and 18.

As the handle 38 is moved upward, the lever teeth (not shown) disengage from the notches 30 in rails 12 and 14 to enable the carriages 16 and 18 to move fore and aft in the horizontal plane defined by the rails 12 and 14 (see FIGS. 2 5). When the handle 38 is released, the lever teeth (not shown) engage the rail notches 30 locking the seat in a desired horizontal position.

The vertical adjustment mechanism 26 includes a pair of quadrants 76 and 78 which also serve as lifting links for adjusting the front height of the seat frame members 22 and 24 relative to the carriages 16 and 18. The quadrants 76 and 78 are fixedly secured to opposite ends of a torsion bar 80 that is journalled to the seat frame members 22 and 24. The torsion bar serves to keep the rotational position of the two quadrants 76 and 78 synchronized.

The quadrants 76 and 78 are in turn coupled to the carriages 16 and 18 to support the front end of the seat frame members 22 and 24 by a pair of support pins 86 fixedly attached to the quadrants. The support pins 86 ext arcuate slots 66 formed in the seat frame mounting members 22 and 24 and are journalled to a corresponding pair of mounting brackets 72 mounted for slidable movement along the carriages 16 and 18. As best shown in FIG. 5, the mounting brackets 72 are configured so as to form an internal rectangular-shaped channel 84 that is adapted to receive the carriages 16 and 18 to accommodate relative sliding movement therebetween along the longitudinal axes of the carriages 16 and 18. The length of the mounting brackets 72 is sufficient to prevent binding between the brackets and the carriages 16 and 18. The support pins 86 are journalled through bores 68 formed in raised portions 70 of the mounting brackets 72 and are rotationally secured therein by fasteners 88. The mounting brackets 72 in the preferred embodiment are made from a strong dimensionally stable. polymeric material, such as nylon, to reduce the sliding friction between the mounting brackets 72 and the carriages and also to minimize the amount of noise generated thereby. In addition, the raised portions 70 of the mounting brackets 72 are preferably reinforced with integral ribs 75 (FIGS. 6-8) to enable the mounting brackets to withstand the torque loading imposed thereon when a seat occupant leans backward against the seat back.

The vertical adjustment assembly 26 further includes a handle 90 fixably secured to the torsion bar 42. The torsion bar 42 is journalled for rotational movement to the seat frame members 22 and 24. A pair of locking pawls 92 and 94 is also fixably secured to the torsion bar 42 and is adapted to pivot when the handle 90 is raised. The locking pawls 92 and 94 include apertures 96 for receiving and engaging the teeth 81 on the quadrants 76 and 78. Also, a helical spring 98 provides a biasing force against the handle 90 to return the handle 90 to its original position. The spring 98 is coupled between the seat frame member 22 and torsion bar 42 by flanges 100 and 102, respectively.

The vertical adjustment mechanism 26 functions as follows. When the handle 90 is pulled in an upward direction against the bias of spring 98, the locking pawls 92 and 94 are released, thereby disengaging apertures 96 from the teeth 81 of quadrants 76 and 78 as seen in phantom in FIG. 2. With the locking pawls 92 and 94 disengaged from teeth 81, the seat frame members 22 and 24 are free to move vertically, either up or down, with respect to the carriages 16 and 18 (See FIGS. 6-8).

Figure 7:
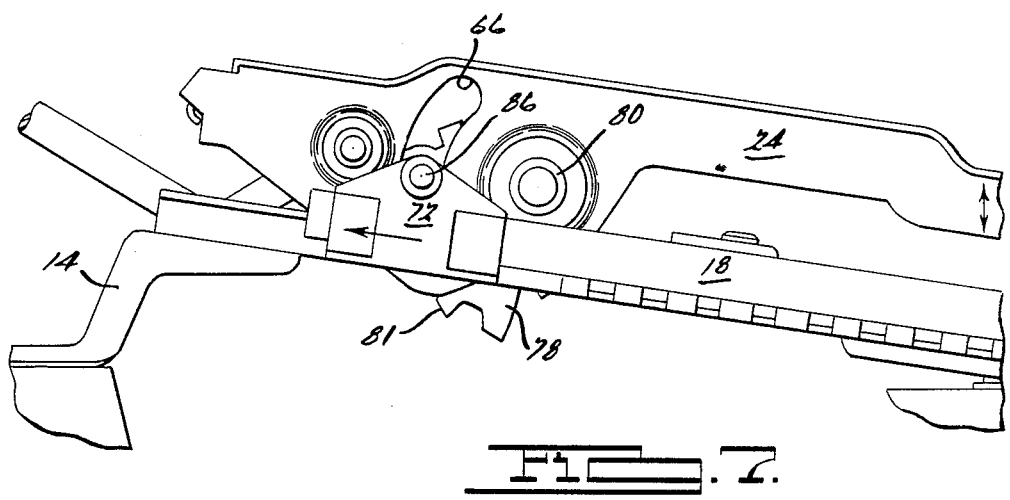
FIG. 7 is a side elevation view similar to FIG. 6 with the seat assembly in a second position.

For discussion purposes and to illustrate the vertical movement of the seat frame members. FIG. 6 illustrates the seat frame member 24 in a first or down position. FIG. 7 illustrates the seat frame member 24 in a second or intermediate position, and FIG. 8 illustrates the seat frame member 24 in a third or up position.

Figure 8:
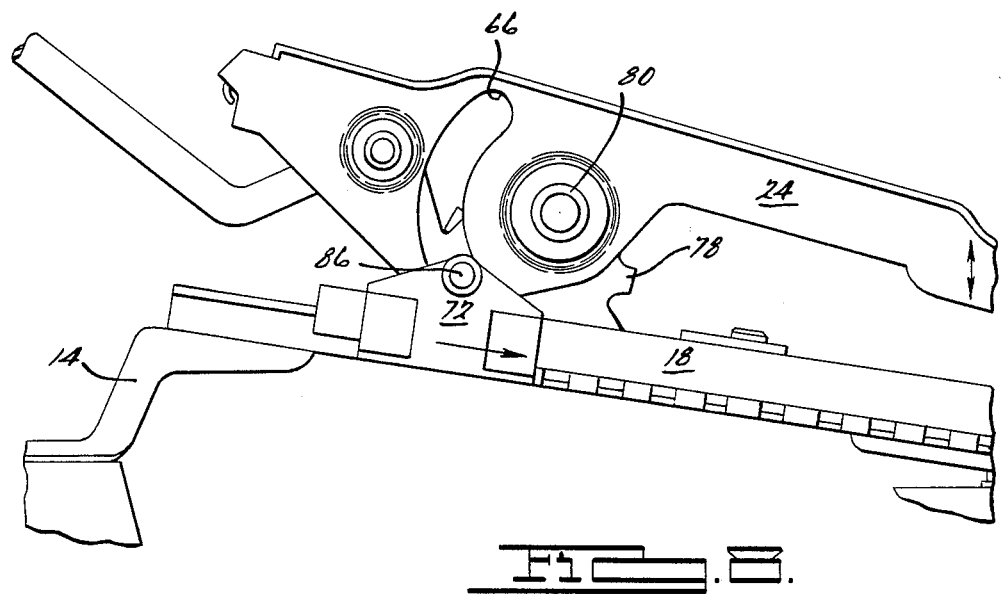
FIG. 8 is a side elevation view similar to FIG. 6 with the seat assembly in a third position.

As the seat frame members 2? and 24 begin to move vertically from the down position in FIG. 6 to the up position shown in FIG. 8, the pivot points of the quadrants 76 and 78 are also raised. This movement causes the quadrants 76 and 78 to rotate due to the fact that the quadrants 76 and 78 are tied at a point radially spaced from their pivot points to the mounting brackets 72 by the support pins 86. It will be noted, however, that as the quadrants 76 and 78 rotate with the upward movement of the seat frame members 22 and 24, the support pins 86 are displaced initially in a forward direction, as illustrated in FIG. 7, and thereafter in a rearward direction, as shown in FIG. 8. This horizontal displacement of the support pins 86 is accommodated by the slidable connection between the mounting brackets 72 and the carriages 16 and 18. Upon attaining the desired seat height position, the handle 90 is released and the locking pawls 92 and 94 re-engage the teeth on the quadrants 76 and 78 to lock the seat in position.

Thus, it will be appreciated that by tying the support pins 86 directly to the quadrants 76 and 78, the quadrants 76 and 78 serve not only to secure the selected vertical position of the seat, but also function as lift links to raise and lower the seat frame 22 and 24. Moreover, it will further be appreciated that the present invention is designed to operate smoothly and quietly with a minimum of effort. In this regard, it is further to be noted that the present invention preferably includes plastic bushings at the pivot points of the torsion bar 80 and latch handles 38 and 90 to reduce noise and enhance ease of operation.

While the above description constitutes the preferred embodiment of the invention, it will be appreciated that the invention is susceptible to modification, variation, and change without departing from the proper scope or fair meaning of the accompanying claims.

What is claimed is:

1. A manually operable four-way vehicle seat adjusting mechanism comprising:
    a pair of stationary tracks defining a substantially horizontal plane;
    elongated carriages movable longitudinally on said tracks;
    means for selectively moving said carriages axially along said tracks, said means for selectively moving coupled with said tracks and carriages, and
    means for vertically adjusting the vehicle seat including:
    a seat frame adapted to be fastened to the vehicle seat and pivotably coupled to said elongated carriages;
    a pair of quadrants fixably secured at opposite ends of a first torsion bar, said first torsion bar being journalled for rotation to said seat frame, each of said quadrants having one or more teeth formed thereon;
    a pair of support brackets slidably coupled to said carriages for longitudinal movement therealong and connected to said pair of quadrants at points radially spaced from the points of rotation of said quadrants; and
    means for activating said vertical adjustment means including pawl means for releasably engaging the teeth of said quadrants to thereby enable selective stopping of the seat during movement to lock the seat at selected vertical positions.

2. The mechanism of claim 1 wherein said support brackets are made from a plastic material.

3. The mechanism according to claim 1 wherein said seat frame comprises a pair of elongated members having two ends, the rearward ends of said members being pivotally secured for rotation to said carriages.

4. The mechanism according to claim 3 wherein said quadrants include a pair of pins journalled to said support brackets and fixably secured to said quadrants at said radially spaced points.

5. The mechanism according to claim 4 wherein said activation means includes a handle affixed to a second torsion bar, said second torsion bar journalled for rotation with said seat frame, and a pair of pawls for selectively engaging said one or more teeth of said quadrants for enabling selective vertical positioning of the seat.

6. A vehicle seat comprising:
   a seat bottom coupled with a manually operable four-way adjustment means, said adjustment means including:
   a stationary track defining a substantially horizontal plane;
   an elongated carriage movable axially on said track;
   means for selectively moving said carriage axially along said track, said means for selectively moving coupled with said track and carriage;
   means for vertically adjusting said seat including a seat frame attached to said seat bottom and pivotably coupled to said carriage;
   a quadrant rotatably coupled to said seat frame and having a pin connected to said quadrant at a point radially spaced from the point of rotation of said quadrant;
   a support bracket slidably coupled to said carriage for longitudinal movement therealong, the pin of said quadrant being journalled to said support bracket; and
   means for activating said vertical adjustment means including pawl means for releasably engaging said quadrant to thereby enable selective stopping of said seat at selected vertical positions.

7. The vehicle seat of claim 6 wherein said support brackets are made from a plastic material.

8. The vehicle seat according to claim 6 including a pair of quadrants fixably secured at opposite ends to a first torsion bar, said first torsion bar journalled for rotation with said seat frame, each of said quadrants having one or more teeth for coupling said activation means for enabling selective vertical positioning of the seat.

9. The vehicle seat according to claim 8 including a pair of support brackets slidably mounted on said carriage, sand a pair of pins journalled to said support brackets and fixedly secured to said quadrants at said radially spaced point.

10. The vehicle seat according to claim 9 wherein said activation means includes a handle affixed to a second torsion bar, said second torsion bar being journalled for rotation with said seat frame, and a pair of pawls for selectively engaging said one or more teeth of said quadrants for selective vertical positioning of the seat.

11. A manually operable four-way adjustment mechanism for a vehicle seat comprising:
   a base adapted to be secured to the floor of the vehicle and defining at least one longitudinal track;
   a carriage member slidably engaged with said track for adjustment in the fore and aft direction;
   a seat frame member adapted to be fastened to the underside of the seat bottom and pivotably mounted at its rearward end to said carriage member;
   a quadrant pivotably attached to said seat frame member at its forward end and having teeth formed thereon;
   manual actuation means including pawl means for releasably engaging said teeth of said quadrant;
   a mounting bracket slidably mounted to said carriage; and
   a support pin fixedly connected to said quadrant at a point radially spaced from the pivot point of said quadrant and being journalled to said mounting bracket, such that said quadrant is caused to rotate upon vertical pivoting of said seat frame member relative to said carriage member whereby said mounting bracket accommodates the accompanying fore and aft movement of said support pin.

12. The mechanism of claim 11 wherein said mounting bracket is made from a plastic material.

* * * * *